United States Patent
Powell

(10) Patent No.: US 10,445,410 B2
(45) Date of Patent: Oct. 15, 2019

(54) AUTO CONVERT MEETING LINK TO JOIN BUTTON IN CHAT

(71) Applicant: Cisco Technology, Inc., San Jose, CA (US)

(72) Inventor: Brian C. Powell, El Segundo, CA (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 15/448,755

(22) Filed: Mar. 3, 2017

(65) Prior Publication Data
US 2018/0253215 A1    Sep. 6, 2018

(51) Int. Cl.
| | |
|---|---|
| *G06F 3/0481* | (2013.01) |
| *G06F 17/22* | (2006.01) |
| *H04L 29/06* | (2006.01) |
| *H04L 12/58* | (2006.01) |
| *G06F 17/21* | (2006.01) |
| *H04L 29/08* | (2006.01) |

(52) U.S. Cl.
CPC ........ *G06F 17/2235* (2013.01); *G06F 17/211* (2013.01); *H04L 51/046* (2013.01); *H04L 51/066* (2013.01); *H04L 51/18* (2013.01); *H04L 65/403* (2013.01); *G06F 3/0481* (2013.01); *G06F 3/04817* (2013.01); *H04L 67/02* (2013.01)

(58) Field of Classification Search
CPC .................................................. G06F 3/04817
USPC ....................................................... 715/752
See application file for complete search history.

(56) References Cited

U.S. PATENT DOCUMENTS

| | | | |
|---|---|---|---|
| 8,429,630 B2 * | 4/2013 | Nickolov .............. | G06F 9/4856 717/110 |
| 8,483,375 B2 | 7/2013 | Dhara et al. | |
| 9,008,107 B1 * | 4/2015 | Narayanaswamy .... | H04M 3/56 370/401 |
| 9,235,826 B1 * | 1/2016 | Hamilton ............. | G06Q 10/107 |
| 9,268,868 B2 | 2/2016 | Jang | |
| 9,401,938 B2 | 7/2016 | Bakaev | |
| 2004/0141005 A1 | 7/2004 | Banatwala et al. | |
| 2009/0262915 A1 * | 10/2009 | Wu ......................... | H04M 3/02 379/207.16 |
| 2009/0276771 A1 * | 11/2009 | Nickolov .............. | G06F 9/4856 717/177 |
| 2010/0005142 A1 * | 1/2010 | Xiao ...................... | G06Q 10/10 709/204 |
| 2010/0306122 A1 * | 12/2010 | Shaffer .................. | G06Q 50/01 705/319 |
| 2012/0290508 A1 * | 11/2012 | Bist ......................... | G06N 5/04 706/10 |
| 2014/0222429 A1 * | 8/2014 | DeLand .............. | H04L 12/1813 704/251 |

(Continued)

*Primary Examiner* — William D Titcomb
(74) *Attorney, Agent, or Firm* — Edell, Shapiro & Finnan, LLC

(57) ABSTRACT

A method is provided to simplify the connection to a meeting service based on a link presented in a text-based communication session. The method involves monitoring the text-based communication session among at least two participants and detecting in the text-based communication session a text string that represents a link to a meeting service. The text string is converted to a graphical user interface element that indicates a connection to the meeting service. The graphical user interface element is displayed in association with the text-based communication session.

20 Claims, 8 Drawing Sheets

(56) References Cited

U.S. PATENT DOCUMENTS

| | | |
|---|---|---|
| 2015/0188928 A1 | 7/2015 | Shapiro |
| 2015/0189230 A1* | 7/2015 | Shapiro .................. H04N 7/147 348/14.11 |
| 2018/0041567 A1* | 2/2018 | Kidambi .................. H04L 67/06 |
| 2018/0181413 A1* | 6/2018 | Arunyaangkul ........ G06F 9/451 |

* cited by examiner

US 10,445,410 B2

AUTO CONVERT MEETING LINK TO JOIN BUTTON IN CHAT

TECHNICAL FIELD

The present disclosure relates generally to telecommunications and, more particularly, to connecting to online meeting services.

BACKGROUND

Meeting services that facilitate scheduling and hosting of online meetings with multiple participants via participant computing devices is a popular mode of conducting virtual meetings/conference rooms. Such meeting services provide participants with the ability, via their computing devices, to schedule, initiate, join and conduct meetings between two or more people or bots.

Meeting services have been enhanced over the years to include a number of features, including the connecting to meeting services using direct Uniform Resource Locators (URLs). However, despite such enhancements, it can still be cumbersome connecting to the meetings based on the number of clicks and/or access steps.

DESCRIPTION OF EXAMPLE EMBODIMENTS

Overview

In accordance with one embodiment, a method is provided to simplify the connection to a meeting service based on a link presented in a text-based communication session. The method involves monitoring the text-based communication session among at least two participants and detecting in the text-based communication session a text (character) string that represents a link to a meeting service. The text string is converted to a graphical user interface element that indicates a connection to the meeting service. The graphical user interface element is displayed in association with the text-based communication session.

Example Embodiments

In chat conversations/sessions or collaboration rooms, people frequently post links. Links can be to various videos or web sites, or to something important like a meeting. These links can be easily missed as a user traverses a set of messages for a way to join a meeting.

Techniques are described herein to use pattern matching/recognition to identify a link to a known meeting service and convert the link to a graphical user interface element (e.g., an easily recognizable and clickable button) that a user may use to connect to an online/web-based meeting. The link may be a Hypertext Transport Protocol (HTTP) link such as a Uniform Resource Locator (URL), Session Initiation Protocol (SIP) Uniform Resource Identifier (URI) link, H 323 Internet Protocol (IP) address dialing, or any other type of link that may be used to connect to an online meeting service for a particular online meeting or online personal meeting room.

Figure 1:
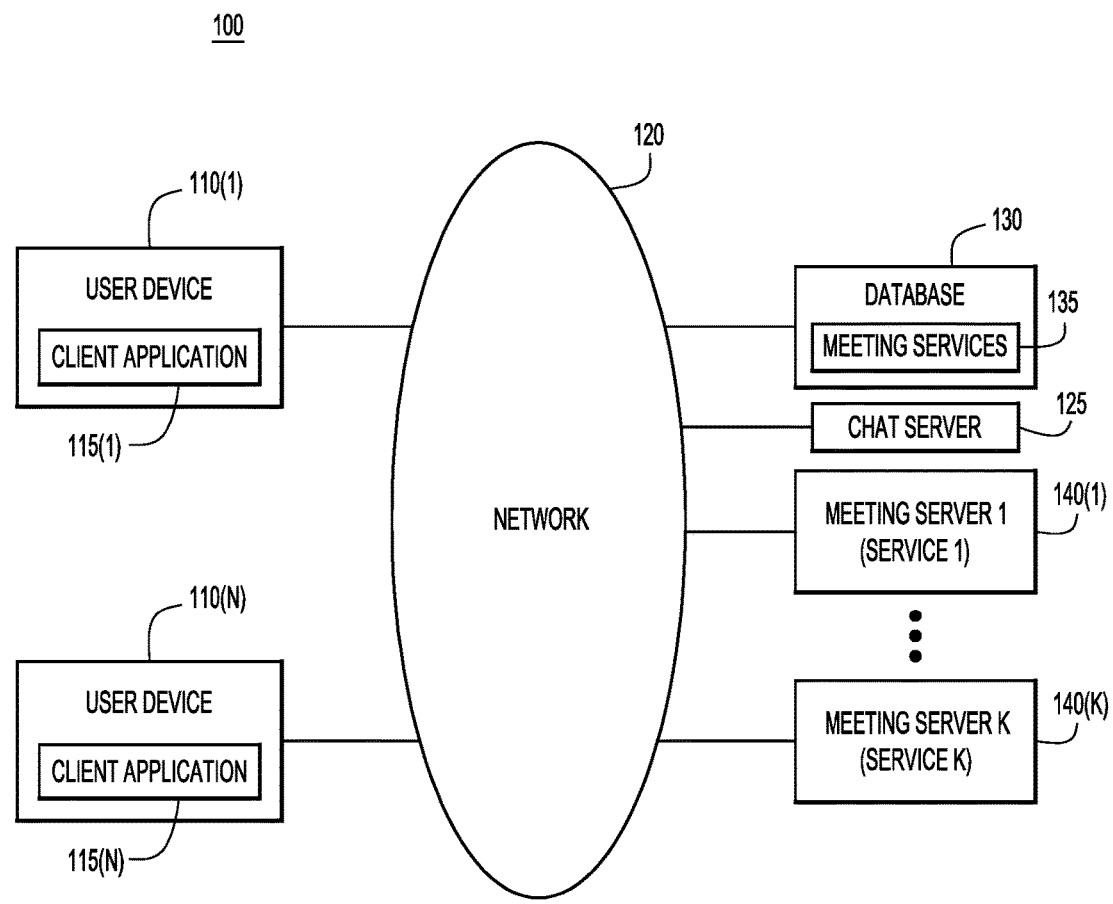
FIG. 1 is a block diagram illustrating a network environment in which the techniques for converting a link detected in a text-based communication session to a graphical user interface element may be used, according to an example embodiment.

Reference is first made to FIG. 1. FIG. 1 shows a system 100 that includes a plurality of user devices 110(1)-110(N), a network 120, a chat (instant messaging) server 125, a database 130, and a plurality of meeting servers 140(1)-140(K) each associated with a different meeting service (Service 1-Service K). The network 120 facilitates communications and exchange of content between two or more user devices 110(1)-110(N). Examples of types of networks that can be utilized within the system depicted in FIG. 1 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Some examples of user devices 110(1)-110(N) that can be used to engage in meetings or other activities within the system of FIG. 1 include, without limitation, stationary (e.g., desktop) computers, personal mobile computer devices such as laptops, note pads, tablets, personal data assistant (PDA) devices, and other portable media player devices, and cell phones (e.g., smartphones) that include suitable input and output devices as described herein. The computing devices and servers can utilize any suitable operating systems (e.g., Android®, Windows®, Mac® OS, Symbian® OS, Blackberry® OS, Linux®, etc.) to facilitate interaction, activities and sharing of information between computing devices via the platform. Suitable meeting server devices 140(1)-140(K) can be any suitable types of stationary or other types of computing devices capable of hosting and managing multiple online meetings or communication sessions of varying types simultaneously as well as receiving, storing and managing content.

As used herein, a participant or user may be a human user or a bot user. A bot is software that is designed to various tasks. One common form of bots, chatbots, simulate conversation.

In one example, each user device runs a chat or messaging client application 115(1)-115(N) which communicates with the chat server 125 over network 120. The chat server 125 supports chat/instant messaging sessions in which text-based communications are passed between the client applications on two or more respective user devices. It should be understood that the database 130 may be co-located/co-resident with the chat server 125 or may be separate entity. Furthermore, the functions of the chat server 125 and database 130 may be integrated with one or more of the meeting servers 140(1)-140(K). As one example, Cisco's Spark™ collaboration service supports chat/instant messaging communication services, online meetings, video calls, etc., all within one online services platform, via a client application (e.g., client application 115(1)-115(N)) running on user devices. It is noted that a bot could be considered a "user device" as used herein. For example, a user asks bot "@bot get next meeting info." The bot then replies with "https://meetingservice1.com/meet/bob", and this link is converted to a graphical user interface element using the techniques presented herein.

The database 130 stores information 135 identifying meeting services (Service 1-Service K), any one or more of which can be used for online meetings between users of user devices 110(1)-110(N). More specifically, the database 130 stores text (character) patterns (e.g., URLs or SIP addresses) associated with each of the meeting services, e.g., www.meetingservice1.com, www.meetingservice2.com, . . . www.meetingservicek.com. Examples of the different meeting services include, by way of example, Cisco System's WebEx® meeting service (www.webex.com), Cisco System's Spark collaboration service (www.ciscospark.com), Citrix's GoToMeeting® meeting service (www.gotomeeting.com), etc.

Generally, according to the techniques presented herein, the chat server 125 monitors text-based communications between two or more users or participants (at their respective user devices) to detect text (character) string (e.g., URL, SIP address, etc.) that represents a link to one of the known web-based meeting services as catalogued in database 130, and converts the text string to a graphical user interface element (e.g., a single click button) for display in-line in an entry of the text-based communication session, or elsewhere in a user interface window displayed to a user. The graphical user interface element indicates that it connects to the web-based meeting service, thereby enabling the user to join a web-based meeting (or connect to a web-based personal meeting room) with a single click action of an easily recognizable graphical user interface element.

The user devices 110(1)-110(N) include software tools or software application modules that allow users/participants to communicate with each other in a variety of different ways (e.g., via email, instant messaging, audio and/or video conferencing, etc.) and share content (e.g., documents, blogs, or any other types of forms of information) via the platform. The term "tool" is used herein to refer to one or more "application" software functions or sets of functions provided by one or more software applications on a client device and/or hosted on a server device on behalf of a client device. Application modules refer to a set of one or more software applications that provide the software tools used by the client devices and/or server devices. The software applications are configured to perform the various operations and functions associated with communications and exchange of information or content between user devices, including the conversions of text strings (e.g., meeting URLs) to graphical user interface elements for connection to a meeting service that supports an online meeting between users/participants according to the techniques described herein. The software applications are located on user devices 110(1)-110(N), the chat server 125, one or more meeting servers 140(1)-140(K), as well as any other computing devices connected to network 120.

Figure 2:
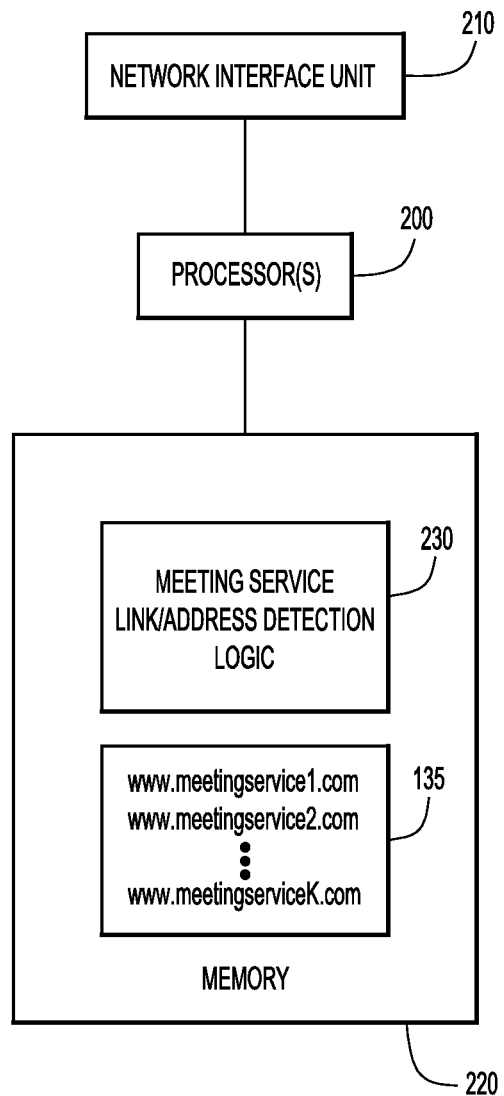
FIG. 2 is a block diagram of a server that participates in the techniques presented herein, according to an example embodiment.

Reference is now made to FIG. 2, which shows the chat server 125 in more detail. As explained above, in one embodiment, the functions of the database 130 are integrated with the chat server 125. To this end, the chat server 125 includes one or more processors 200, a network interface unit 210 and memory 220. The processor(s) 200 may take the form of one or more microprocessors or microcontrollers. A server will typically include a plurality of processors. The network interface unit 210 may take the form of one or more network interface cards (NICs) that enable network connectivity on behalf of the chat server 125. The memory 220 stores instructions for meeting service link/address detection logic 230. The meeting service link/address detection logic 230 includes software instructions that, when executed by the processor(s) 200, cause the chat server 125 to monitor text communications between two or more user devices to detect a text string having a pattern that matches a link or is otherwise associated with one of a plurality of meeting services.

The memory 220 may be read only memory (ROM), random access memory (RAM), magnetic disk storage media devices, optical storage media devices, flash memory devices, electrical, optical, or other physical/tangible memory storage devices. Thus, in general, the memory 220 may comprise one or more tangible (non-transitory) computer readable storage media (e.g., a memory device) encoded with software comprising computer executable instructions and when the software is executed (by the processor(s) 200) it is operable to perform the operations of the meeting service link/address detection logic 230 described herein.

Since the functions of the database 130 are integrated with the chat server 125 in this embodiment, the memory 220 stores the meeting services information 135 (catalogue of meeting services) that was described above in connection with FIG. 1 as being stored in the database 130. As shown in FIG. 2, the meeting services information 135 includes URLs or addresses (e.g., SIP addresses) for each of Services 1 - Services K, as www.meetingservice1.com for Service 1, www. Meetingservice2.com for Service 2, . . . , www.meetingserviceK.com for Service K. This list is dynamic and may be updated upon changes in the meeting services that are frequently used. The meeting service link/address detection logic 230 is designed to parse the text-based communications passed by the chat server 125 between user devices to detect a text string that matches one of the text strings contained in the meeting services information 135. The match need not be a perfect match, and as it should be understood that the URL for a personal meeting room can vary, but for a given meeting service, the URL will always containing the text "meetingservice1.com" in the case of a personal meeting room supported by Service 1, as an example. The processor(s) 200 executes the meeting service link/address detection logic 230 to perform a pattern matching algorithm against text-based communications to detect a text-string that corresponds to a known meeting service based on the stored meeting service information 135. If a text string is detected that matches a URL or address in the meeting service information 135, a notification is sent to the user devices that are participating in the communication session that contained that text string, via the network interface unit 210. The client application running on the user device(s) receives the notification and converts the meeting URL into a graphical user interface element.

Figure 3A:
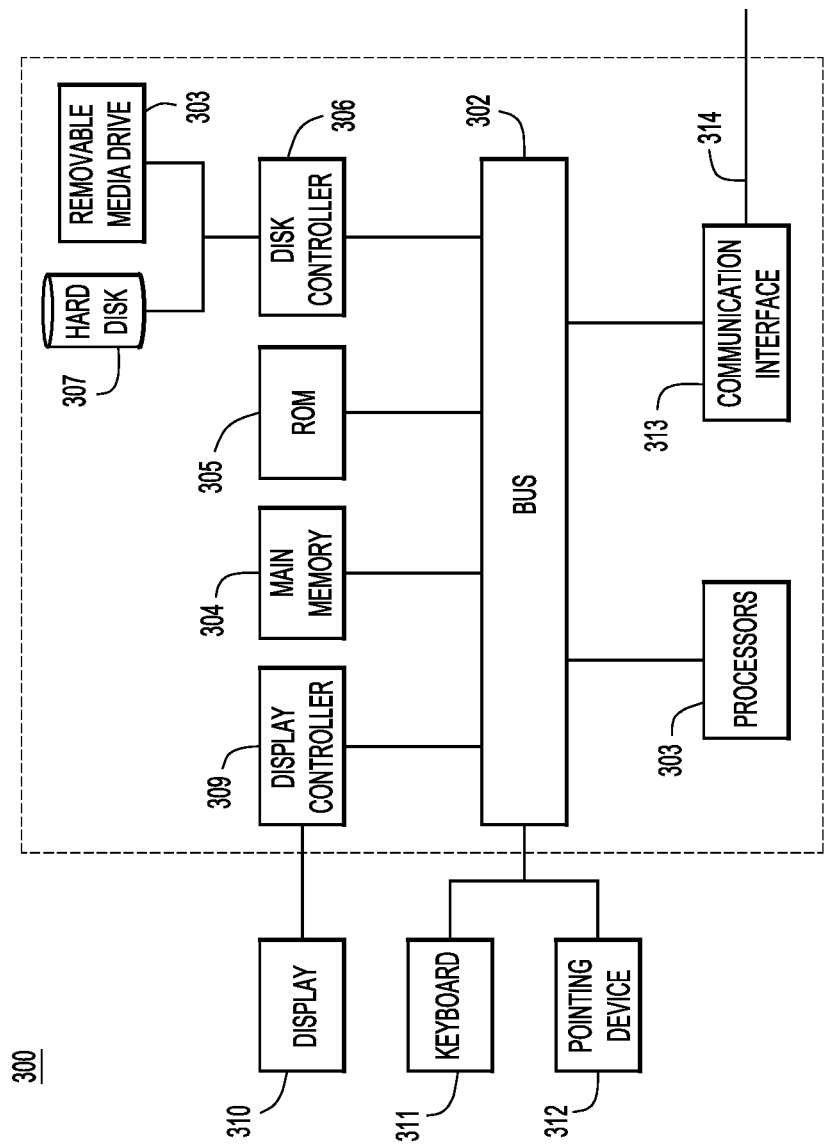
FIG. 3A is a block diagram of a user device that participates in the techniques presented herein, according to an example embodiment.

FIG. 3A illustrates a block diagram of a computer system that may perform the operations of the user devices 110(1)-110(N), and is meant to be representative of any of the user devices 110(1)-110(N) shown in FIG. 1. The computer system 300 may be programmed to implement a computer based user device and is representative of any of the user devices shown in FIG. 1. The computer system 300 includes a bus 302 or other communication mechanism for communicating information, and a processor 303 coupled with the bus 302 for processing the information. While the figure shows a single block 303 for a processor, it should be understood that the processors 303 represent a plurality of processing cores, each of which can perform separate processing. The computer system 300 also includes a main memory 304, such as a random access memory (RAM) or other dynamic storage device (e.g., dynamic RAM (DRAM), static RAM (SRAM), and synchronous DRAM (SD RAM)), coupled to the bus 302 for storing information and instructions to be executed by processor 303. In addition, the main memory 304 may be used for storing temporary variables or other intermediate information during the execution of instructions by the processor 303.

The computer system 300 further includes a read only memory (ROM) 305 or other static storage device (e.g., programmable ROM (PROM), erasable PROM (EPROM), and electrically erasable PROM (EEPROM)) coupled to the bus 302 for storing static information and instructions for the processor 303.

The computer system 300 also includes a disk controller 306 coupled to the bus 302 to control one or more storage devices for storing information and instructions, such as a magnetic hard disk 307, and a removable media drive 308 (e.g., floppy disk drive, read-only compact disc drive, read/write compact disc drive, compact disc jukebox, tape drive, and removable magneto-optical drive) or a solid state memory device. The storage devices may be added to the computer system 300 using an appropriate device interface (e.g., small computer system interface (SCSI), integrated device electronics (IDE), enhanced-IDE (E-IDE), direct memory access (DMA), or ultra-DMA).

The computer system 300 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 300 may also include a display controller 300 coupled to the bus 300 to control a display 310, such as a liquid crystal display (LCD), light emitting diode (LED) display, or other now known or hereinafter developed display technologies, for displaying information to a computer user. The computer system 300 includes input devices, such as a keyboard 311 and a pointing device 312, for interacting with a computer user and providing information to the processor 303. The pointing device 312, for example, may be a mouse, a trackball, or a pointing stick for communicating direction information and command selections to the processor 1203 and for controlling cursor movement on the display 310. The display 310 may be a touch-screen display, which is common on hand-held devices, such as smartphones and tablets, and in that case there would be no need for a keyboard 311 and pointing device 312.

The computer system 300 performs a portion or all of the processing steps of the process in response to the processor 303 executing one or more sequences of one or more instructions contained in a memory, such as the main memory 304. Such instructions may be read into the main memory 304 from another computer readable medium, such as a hard disk 307 or a removable media drive 308 or solid state memory disk. One or more processors in a multi-processing arrangement may also be employed to execute the sequences of instructions contained in main memory 304. In alternative embodiments, hard-wired circuitry may be used in place of or in combination with software instructions. Thus, embodiments are not limited to any specific combination of hardware circuitry and software.

As stated above, the computer system 300 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, FLASH EPROM), DRAM, SRAM, SD RAM, or any other magnetic medium, or an optical medium.

Stored on any one or on a combination of non-transitory computer readable storage media, embodiments presented herein include software for controlling the computer system 300, for driving a device or devices for implementing the process, and for enabling the computer system 300 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 300 also includes a communication interface 313 coupled to the bus 302. The communication interface 313 provides a two-way data communication coupling to a network link 314 that is connected to, for example, a local area network (LAN) 315, or to another communications network 316 such as the Internet. For example, the communication interface 313 may be a wired or wireless network interface card to attach to any packet switched (wired or wireless) LAN. Wireless links may also be implemented. In any such implementation, the communication interface 313 sends and receives electrical, electromagnetic or optical signals that carry digital data streams representing various types of information.

The network link 314 typically provides data communication through one or more networks to other data devices. For example, the network link 314 may provide a connection to another computer through a local area network (e.g., a LAN) or through equipment operated by a service provider, which provides communication services through a communications network.

Figure 3B:
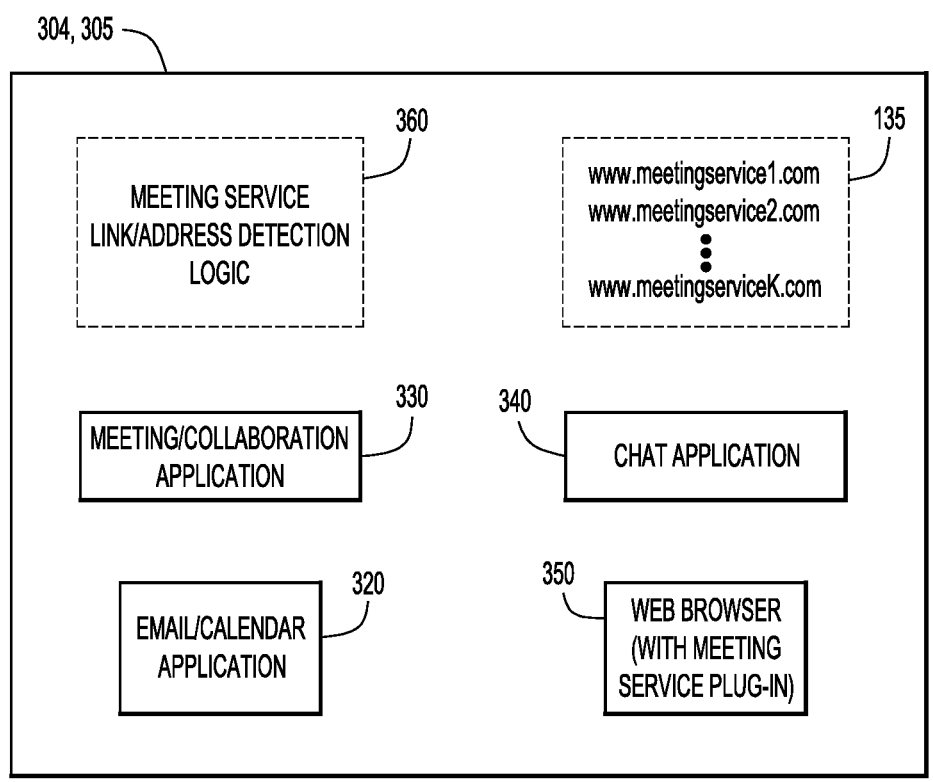
FIG. 3B is a diagram illustrating software modules of the user device, according to an example embodiment.

Turning now to FIG. 3B, a diagram is shown of software module that may reside on the user device in memory, such as main memory 304 or ROM 305 depicted in FIG. 3A. For example, there is an email/calendar application 320, a meeting application 330, a chat application 340, and a web browser application 350 that includes a meeting service plug-in for any one or more of the aforementioned meeting services. The chat application 340 may take the form of an enterprise-internal chat application, an instant messaging service (IMS) application or a short messaging service (SMS) application (commonly used on smartphones. Furthermore, the meeting/collaboration application 330 may have integrated chat/instant messaging functionality, as is the case with Cisco's Spark application and service. Further still, the functions of the meeting service link/address detection logic, may be resident on the user device itself, as shown in phantom at reference numeral 360 based on the meeting service information stored locally at the user device as shown in phantom at 135.

Figure 4:
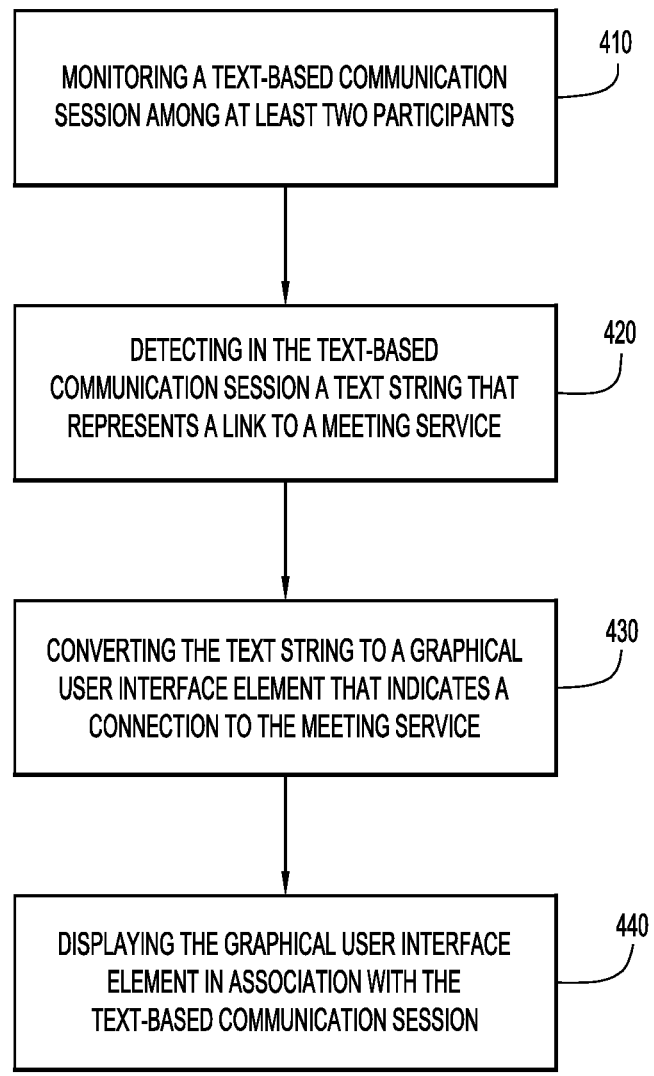
FIG. 4 is a high-level flow chart of a method for converting a link detected in a text-based communication session to a graphical user interface element, according to an example embodiment.

With reference now to FIG. 4, and continued reference to FIG. 1, a flow chart is now described for a process 400 to automatically convert a meeting text string to a graphical user interface element according to an example embodiment. The process 400 may be performed by a server, e.g., the chat server 125 shown in FIG. 1, or by a user device that is participating in a text-based communication session.

At 410, a text-based communication session among at least two participants (at their respective user devices) is monitored. Using pattern matching logic and stored information 135 for a plurality of meeting services, at 420, a detection is made in the text-based communication session of a text string that represents a link to a meeting service. The text string for a link may be a combination of characters (letters, numbers and other characters, such as double-byte character set (DBCS), which may be useful for premise-based solutions that use links of the form meetingservice1.customerdomain.com). At 430, the text string that is detected at 420 as representing a link to a meeting service is converted to a graphical user interface element that indicates (by clicking or selecting it) a connection to the meeting service. At 440, the graphical user interface element is displayed in association with the text-based communication session.

The detecting operation 420 may involve parsing text in the text-based communication session to detect a text-string that is a universal resource locator, and pattern matching of the universal resource locator with respect to known meeting services to determine that the universal resource locator refers to a meeting service. In so doing, the detection operation 420 may include expanding the universal resource locator by following all redirects associated with the universal resource locator to produce a resolved universal resource locator, such that the pattern matching is based on the resolved universal resource locator with respect to a database of the known meeting services.

As explained above, the operations of the process 400 may be performed by a server (e.g., the chat server 125) or they may be performed locally on the user device. Since the chat server 125 serves as an intermediate entity between user devices participating in a communication session, the chat server can perform operations 410-440. Alternatively, a user device may have the capabilities to perform operations 410-440 entirely locally on the user device. As still a further alternative, a hybrid approach may be employed in which some of the operations of process 400 are performed by a chat server and other operations are performed locally on the user device. For example, operation 410 may be performed locally on a user device and operation 420 may be performed by a chat server after the user device sends a notification to the chat server where operations 420 and 430 are performed using the database 130 of meeting services stored or accessible by the chat server. In this way, if there are updates many to the database 130, those updates can be leveraged in converting a text string to a graphical user interface element. In the event that a text string cannot be matched to a URL or address for a meeting service stored in the database 130, then a conversion to a graphical user interface element cannot be made.

Figure 5:
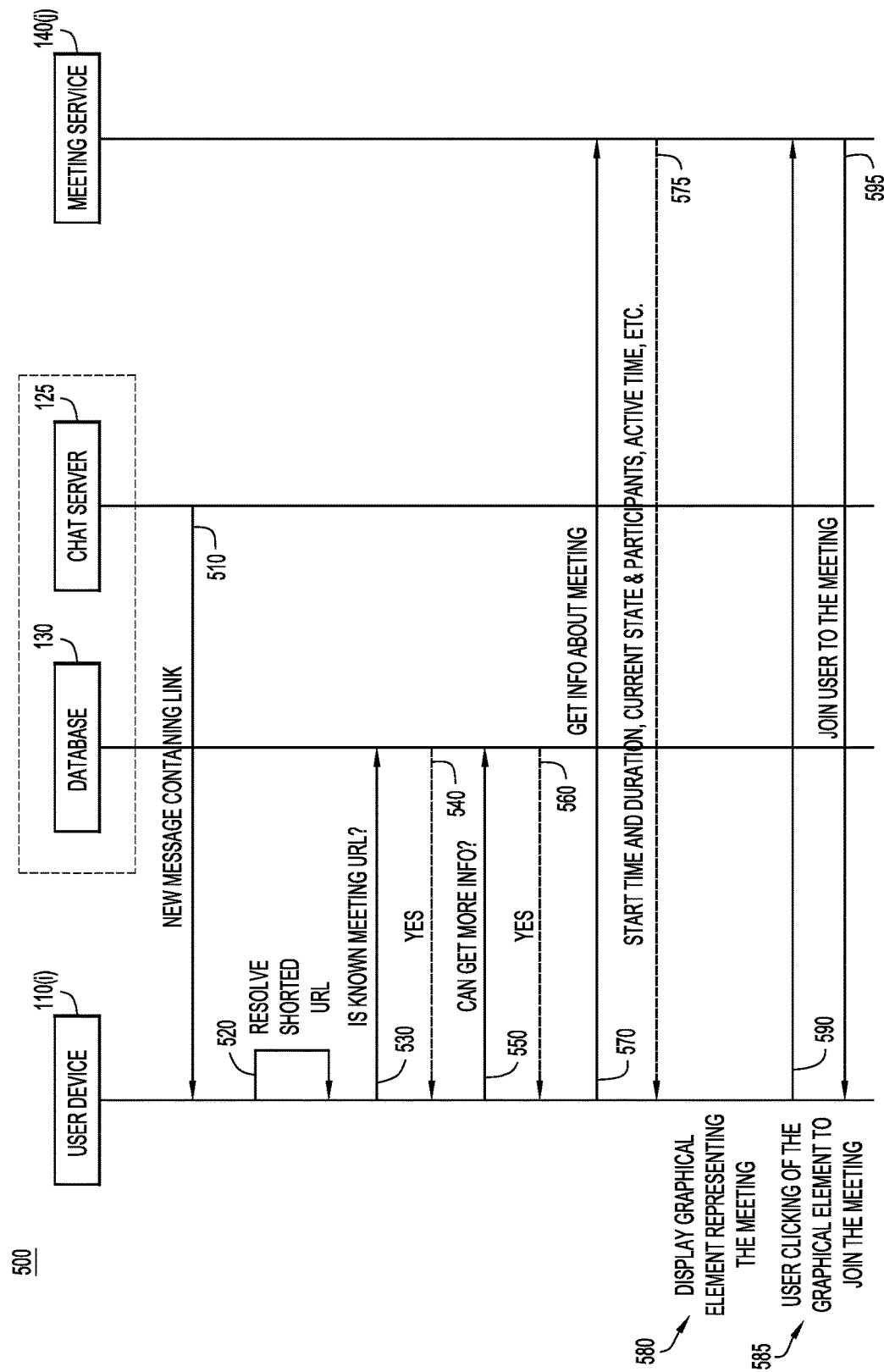
FIG. 5 is a diagram illustrating a message flow according to an example embodiment.

Turning now to FIG. 5, a sequence diagram 500 is described of a more specific example embodiment of the techniques described herein. In FIG. 5, user device 110(i) is meant to refer to any arbitrary one of the user devices 110(1)-110(N) and meeting service 140(j) is meant to refer to any arbitrary one of the meeting services 140(1)-140(K) shown in FIG. 1. The chat server 125 and database 130 may be part of the same entity and reside in the cloud. Alternatively, as described above, the database 130 may be locally stored on the user device 110(i). At 510, a user posts a message in a chat session, and the message contains a link (e.g., a URL). The user device 110(i) will receive the message from the chat server 125, as part of the chat session. The URL is resolved at 520 by operations performed on the user device. At 530, the user device 110(i) sends a notification to the entity that manages the database 130 in order determine whether the resolved URL is for a meeting service that is in the master list of known meeting services stored in the database 130. It is to be noted that a client application may have a local database or regular expression capability as shown in FIG. 3B, to perform a local check, at 530, instead of that operation being performed by the entity that manages the database 130. The local database can be kept up to date on a regular basis with the database 130, or when a miss occurs in the local database, a notification can be sent to the chat server 125/database 130 as a back-up check.

If the meeting URL is determined to be known, a response from the database 130 is sent to the user device 110(i) at 540. The user device 110(i) may then convert the URL to a graphical user interface element in chat session. Thus, if it is determined by operations 530 and 540 that the link is to a meeting service, then the user device can render that link in a customized manner so that the user can readily see/know that the link is not just a website. The link may be for a web-based meeting already in progress, an ad-hoc web-based meeting, or a scheduled web-based meeting to be conducted in the future.

At 550, the user device 110(i), based on the response from the database 130, optionally may send a request to source more information about the meeting. The database 130 may store information indicating whether the meeting service 140(j) is a meeting service from which additional information about the meeting can be obtained (through an appropriate application programming interface, for example). Such a meeting service may be a source of extended/additional (context) information about the meeting that can be used to display a further customized view of information about the meeting on the user device 110(i). At 560, the database 130 may respond in the affirmative to the request sent at 550. At 570, the user device 110(i) will send a request to the meeting service 140(j) to obtain meeting related data (i.e. start time and duration, current time and participants of the meeting, active time etc.), which is returned to the user device 110(i) by the meeting service 140(j) at 575. Operations 550-575 are optional operation insofar as not all meeting services support the ability to provide additional information about a meeting.

Examples of extended/additional information about the meeting that may be obtained at operations 550-575 include: meeting start time and duration; identities of participants already/currently in the meeting (such as names and/or shrunken head icons for each participate); meeting status (such as time elapsed for the meeting that has already started); identity of the host of the meeting; and ability for the user of the user device 110(i) to join the meeting. In one example, the link in the posted message may be for an ongoing meeting that a user of user device 110(i) is being invited to after the fact, or the person who posted the message with the link wants to have an ad-hoc meeting in his/her Personal Meeting Room.

At 580, the user device displays a graphical user interface element representing the meeting in the chat session or some other location in a user interface screen presented on the user device. Thus, the link is replaced by an easy to identify user interface element. The graphical user interface element may be configured with a hover feature to display the additional information about the meeting as sourced from the meeting server 140(j) at operations 570 and 575. At 585, the user can click on the graphical user interface element to join the meeting, which results in a join request being sent at 590 to the meeting service 140(j). The meeting service 140(j) receives the join request and joins the user to the meeting at 595, after which the meeting graphical user interface is launched for the user.

The following are additional details about the operations described in connection with FIG. 5. The link in the text-based communication session, such as the one received at 510, may be a URL or SIP URI that serves as a link to a resource which contains a domain. This domain gives a hint as to how to handle it. HTTP URLs can be redirected and followed to their real location. In some scenarios, a Meeting Registry Service (MRS) enables the lookup of HTTP URLs, SIP URIs, and meeting numbers for known meetings. Anything that is known to the system can be handled the same way as they will all map back to the same domain.

The resolver operation 520 in FIG. 5 follows redirects (HTTP code 3XX) to the final page. The response header will contain a "location:" field which contains the next URL to check. This is done recursively as a link can be redirected more than once.

For example:
General
Request URL: https://ms1.co/B4A6C10
Request Method: GET
Status Code: 301 Moved Permanently
Remote Address: 107.23.223.185.80
Response Headers
Cache-Control: no-cache, no-store, must-revalidate
Connection: keep-alive
Content-Type: text/html; charset =UTF-8
Date: Wed, 02 Nov 2016 23:54:55 GMT
Expires: Thu, 01 Jan 1970 00:00:00 GMT
Location: http://go.meetingservice1.com/meet/username
Pragma: no-cache Thus, as depicted at operations 550-575, a determination is made as to whether the web-based meeting service to which the text string is a link allows retrieval of information associated with a web-based meeting supported by the web-based meeting service. If it is determined that the web-based meeting service allows retrieval of information, retrieval is made for the web-based meeting of one or more of: start time and duration, identities of participants, identity of meeting host, or meeting status.

Figure 6A:
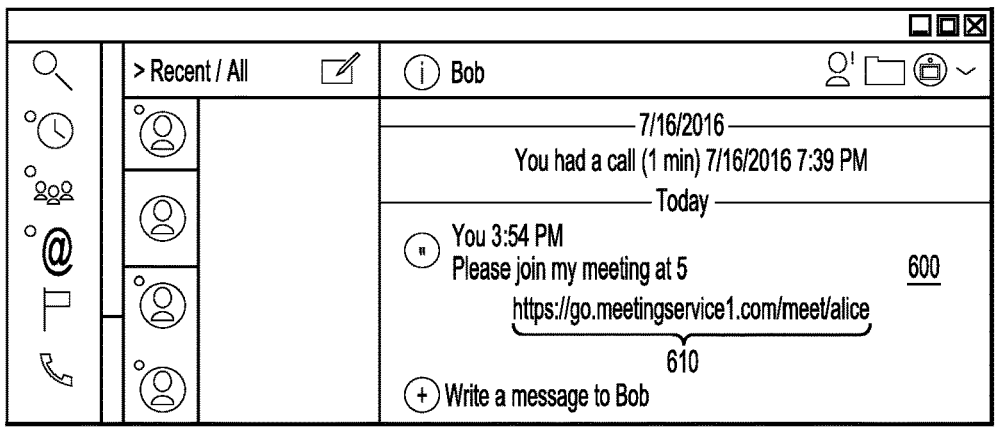
FIG. 6A-6C are diagrams illustrating example displays of a chat session and a graphical user interface element derived from a link detected in a text-based communication session, according to an example embodiment.
Figure 6B:
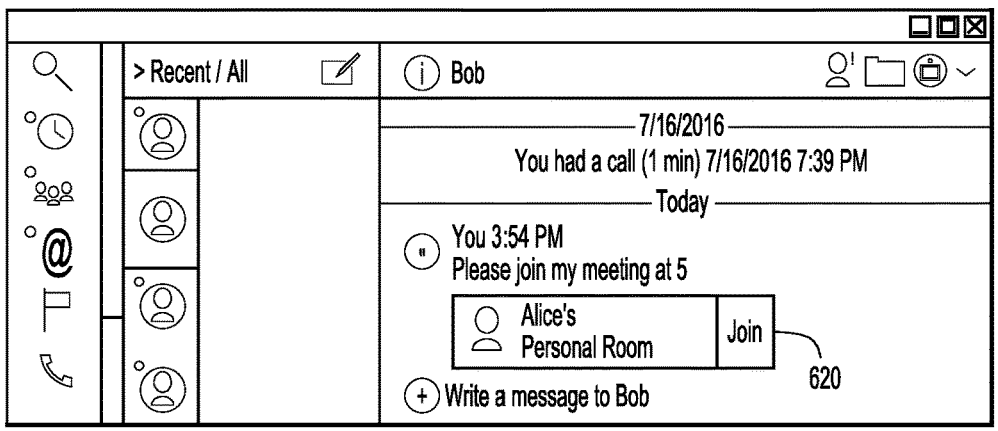
Figure 6C:
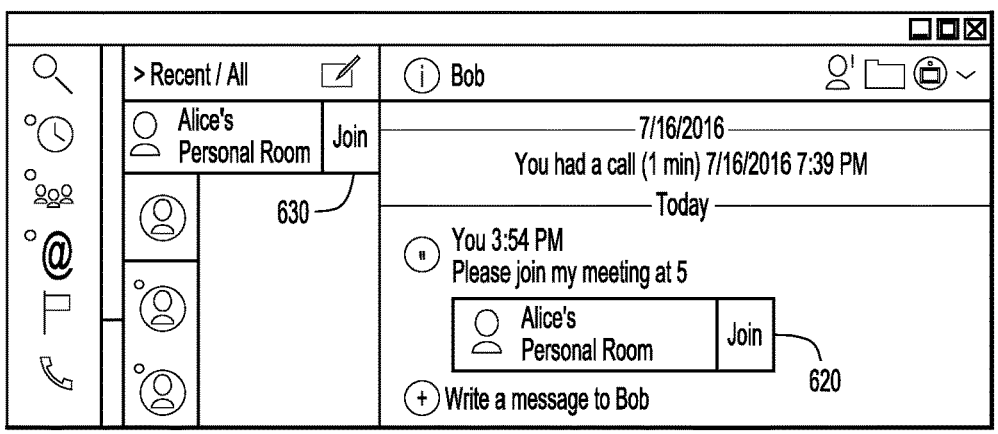

Reference is now made to FIGS. 6A-6C for an example graphical user interface. FIG. 6A shows a window of a collaboration application in which a chat session is occurring between a user Bob and a user Alice, in a collaboration room called Bob. In FIG. 6A, Alice sends a message 600 to Bob with the text that says:

"Please join my meeting at 5
https://go.meetingservice1.com/meet/alice"

Thus, the message 600 includes a link (e.g., URL) 610 consisting of the text string https://go.meetingservice1.com/meet/alice. FIG. 6B shows the results of the techniques presented herein where the text string for link 610 is automatically converted to a graphical user interface button 620 that reads "Alice's Personal Room" and this button 620, when clicked, will connect the user to Alice's web-based personal meeting room. The action button 620 is much more user friendly because it allows a user to just click on it to join a meeting, rather than having to copy and paste the meeting URL (shown at 610 in FIG. 6A) into a browser window. Moreover, changing the link in graphical user interface action button visually assists the user in distinguishing the meeting link from any other URL. In one example, the button 620 may have the word "JOIN" on it so that it clearly indicates to a user that it is a button that will join the user to a meeting.

FIG. 6C shows how, at the time of the meeting, a graphical user interface element 630, generated from the meeting link, is displayed in the Recents section on the left of the graphical user interface window/screen.

Figure 7:
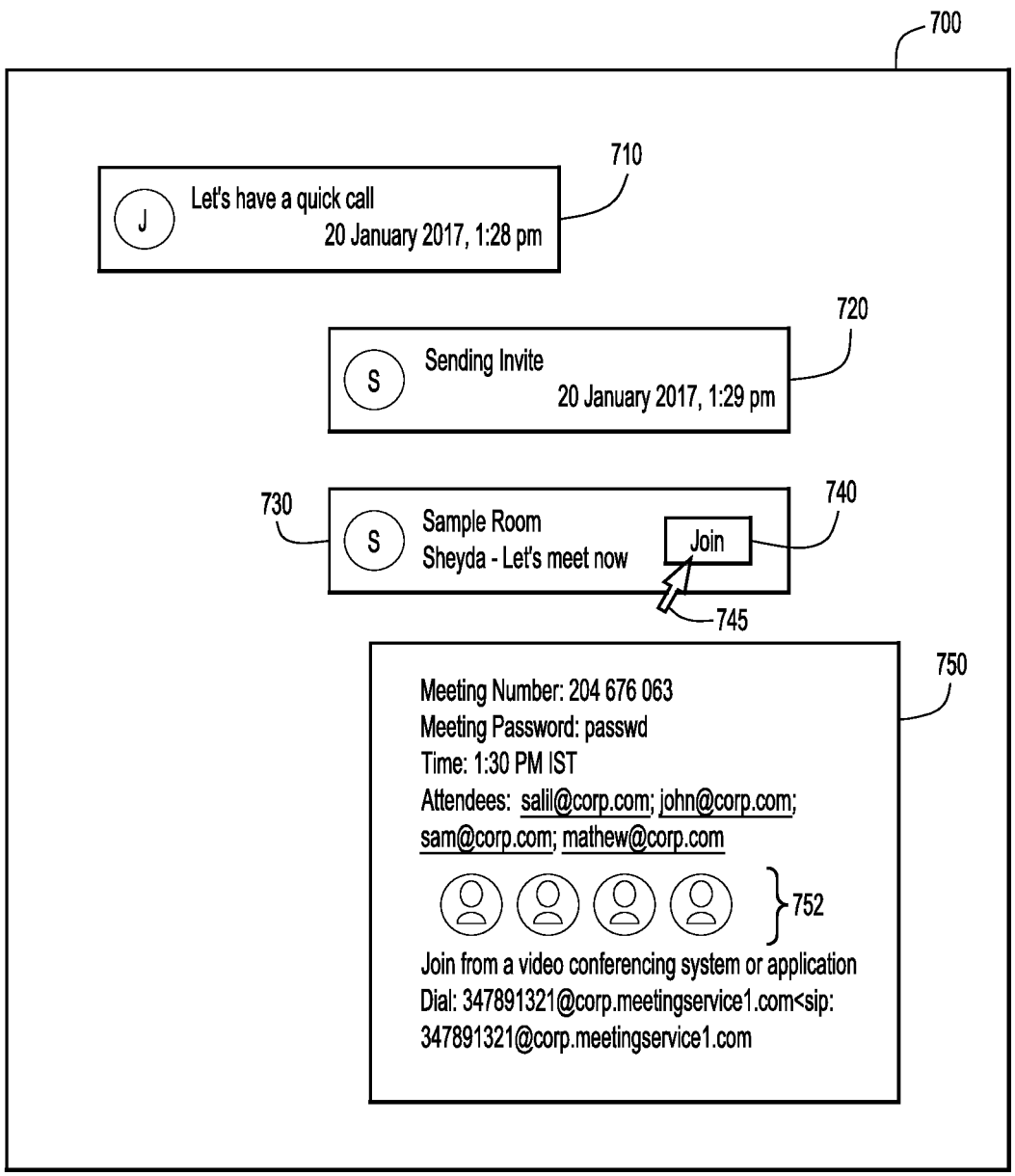
FIG. 7 illustrates a further examples of display of context information about a web-based meeting derived from a link detected in a text-based communication session, according to an example embodiment.

As explained above, the action button may be configured to provide a hover feature to display the meeting details obtained from the meeting service. To this end, as shown in FIG. 7, a chat session exchange 700 is shown that consists of messages 710, 720, and 730. In message 730, a meeting link was included (not shown) that was automatically converted to a graphical user interface button 740. When a user places a cursor over button 740 (as shown in FIG. 7), a hover feature will render the extended/additional meeting context information 750 that may include details such as: meeting time, meeting date, duration, names/identities of meeting participates (e.g., salil@corp.com, john@corp.com, sam@corp.com and mathew@corp.com) attendees and phone numbers. In addition, the hover feature may cause the display of icons/photos for the various meeting participants as shown at reference numeral 752. Other potential user state attributes that can be displayed may be the use of an icon/photo to indicate a user has joined, and there can be other states like "declined", "be there soon", etc.

The techniques presented above (including the various user interface concepts) are applicable to any text-based communication session, including email, other text-based sessions that are either separate (stand-alone) applications or functions within a another application, such as a collaboration room (e.g., Cisco Spark® collaboration service), or a chat session as part of a video conference.

Using the techniques presented herein, it is simple to join a meeting when someone posts the meeting link in a chat message, by converting a link to a button with context information (the aforementioned extended/additional information about the meeting). The user does not have to copy and paste the link into a browser, video endpoint or other device, though some applications have a way to click a URL to open a browser, but even in this case the URL is not as easily recognizable/visible to a human user. This provides a simple click and join experience. The context information notifies the user that other people are already in the meeting or that the meeting has not yet started. In clients which simply launch the link to a browser there are no extra steps, plugins and applications to download and extra time needed to join a meeting.

In summary, in one form, a computer-implemented method is provided, comprising: monitoring a text-based communication session among at least two participants; detecting in the text-based communication session a text string that represents a link to a meeting service; converting the text string to a graphical user interface element that indicates a connection to the meeting service; and displaying the graphical user interface element in association with the text-based communication session.

In another form, an apparatus is provided, comprising: a network interface unit configured to enable network communications; a processor coupled to the network interface unit, wherein the processor is configured to: monitor a text-based communication session among at least two participants; detect in the text-based communication session a text string that represents a link to a meeting service; convert the text string to a graphical user interface element that indicates a connection to the meeting service; and cause display of the graphical user interface element in association with the text-based communication session.

In still another form, one or more non-transitory computer readable storage media are provided, encoded with instructions that, when executed by a processor, cause the processor to perform operations including: monitoring a text-based communication session among at least two participants; detecting in the text-based communication session a text string that represents a link to a meeting service; converting the text string to a graphical user interface element that indicates a connection to the meeting service; and displaying the graphical user interface element in association with the text-based communication session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   monitoring, by a server supporting text-based communication sessions, a text-based communication session among at least two participants;
   detecting, by the server, in the text-based communication session a text string that is received from a first participant and represents a link to a known meeting service at least in part by: parsing text in the text-based communication session to identify the text string, and pattern matching at least part of the text string with at least part of text strings indicative of known meeting services;
   in response to detection of the text string in the text-based communication session, converting, by the server, the text string to a graphical user interface element that allows a connection by a second participant to the known meeting service; and
   outputting, for display via a graphical user interface, the graphical user interface element in association with the text-based communication session.

2. The method of claim 1, wherein detecting comprises:
   parsing text in the text-based communication session to detect a text-string that is a universal resource locator; and
   pattern matching of the universal resource locator with respect to known meeting services to determine that the universal resource locator refers to a meeting service.

3. The method of claim 2, wherein detecting further comprises:
   expanding the universal resource locator by following all redirects associated with the universal resource locator to produce a resolved universal resource locator;
   wherein pattern matching is based on the resolved universal resource locator with respect to a database of the known meeting services.

4. The method of claim 1, further comprising:
   in response to received input associated with the graphical user interface element, retrieving meeting information corresponding to a current state of a meeting supported by the known meeting service; and
   displaying, via the graphical user interface, the meeting information corresponding to the current state of the meeting in association with the text-based communication session.

5. The method of claim 1, further comprising:
   determining whether the known meeting service to which the text string is a link allows retrieval of information associated with a meeting supported by the known meeting service;
   if it is determined that the known meeting service allows retrieval of information, retrieving for the meeting one or more of: start time and duration, identities of participants, identity of meeting host, or status; and
   outputting, for display by the graphical user interface, the information associated with the meeting.

6. The method of claim 5, further comprising displaying the information associated with the meeting including at least one of: identity information of participants of the meeting or identifiers of participants already in the meeting.

7. The method of claim 1, wherein the text-based communication session is one of a: chat session, email communication, or text-messaging session.

8. The method of claim 1, further comprising displaying the graphical user interface element by a client application running on a user device.

9. The method of claim 1, wherein the link is for a meeting already in progress, an ad-hoc meeting, or a scheduled meeting to be conducted in the future.

10. An apparatus comprising:
    a network interface unit configured to enable network communications;
    a processor coupled to the network interface unit, wherein the processor is configured to:
      monitor a text-based communication session among at least two participants;
      detect in the text-based communication session a text string that is received from a first participant and represents a link to a known meeting service at least in part by: parsing text in the text-based communication session to identify the text string, and pattern matching at least part of the text string with at least part of text strings indicative of known meeting services;
      in response to detection of the text string in the text-based communication session, convert the text string to a graphical user interface element that allows a connection by a second participant to the known meeting service; and
      cause display, via a graphical user interface, of the graphical user interface element in association with the text-based communication session.

11. The apparatus of claim 10, wherein the processor is configured to detect by:
    parsing text in the text-based communication session to detect a text-string that is a universal resource locator; and
    pattern matching of the universal resource locator with respect to known meeting services to determine that the universal resource locator refers to a meeting service.

12. The apparatus of claim 11, wherein the processor is further configured to:
    expand the universal resource locator by following all redirects associated with the universal resource locator to produce a resolved universal resource locator; and perform the pattern matching based on the resolved universal resource locator with respect to a database of the known meeting services.

13. The apparatus of claim 10, wherein the processor is configured to:
in response to received input associated with the graphical user interface element, retrieve meeting information corresponding to a current state of a meeting supported by the known meeting service; and
cause display, via the graphical user interface, of the meeting information corresponding to the current state of the meeting in association with the text-based communication session.

14. The apparatus of claim 10, wherein the processor is further configured to:
determine whether the known meeting service to which the text string is a link allows retrieval of information associated with a meeting supported by the known meeting service; and
if it is determined that the known meeting service allows retrieval of information, retrieve for the meeting one or more of: start time and duration, identities of participants, identity of meeting host, or status.

15. The apparatus of claim 14, wherein the processor is further configured to cause display of the information associated with the meeting.

16. One or more non-transitory computer readable storage media encoded with instructions that, when executed by a processor, cause the processor to perform operations including:
monitoring a text-based communication session among at least two participants;
detecting in the text-based communication session a text string that is received from a first participant and represents a link to a known meeting service at least in part by: parsing text in the text-based communication session to identify the text string, and pattern matching at least part of the text string with at least part of text strings indicative of known meeting services;
in response to detection of the text string in the text-based communication session, converting the text string to a graphical user interface element that allows a connection by a second participant to the known meeting service; and
displaying, via a graphical user interface, the graphical user interface element in association with the text-based communication session.

17. The non-transitory computer readable storage media of claim 16, wherein the instructions operable for detecting include instructions operable for:
parsing text in the text-based communication session to detect a text-string that is a universal resource locator; and
pattern matching of the universal resource locator with respect to known web-based meeting services to determine that the universal resource locator refers to a meeting service.

18. The non-transitory computer readable storage media of claim 16, further comprising instructions operable for:
in response to received input associated with the graphical user interface element, retrieving meeting information corresponding to a current state of a meeting supported by the known meeting service; and
displaying, via the graphical user interface, the meeting information corresponding to the current state of the meeting in association with the text-based communication session.

19. The non-transitory computer readable storage media of claim 16, further comprising instructions operable for:
determining whether the known meeting service to which the text string is a link allows retrieval of information associated with a meeting supported by the known meeting service; and
if it is determined that the known meeting service allows retrieval of information, retrieving for the meeting one or more of: start time and duration, identities of participants, identity of meeting host, or status.

20. The non-transitory computer readable storage media of claim 19, further comprising instructions operable for displaying the information associated with the meeting.

* * * * *